(12) United States Patent
Seo et al.

(10) Patent No.: US 7,769,275 B2
(45) Date of Patent: Aug. 3, 2010

(54) RECORDING MEDIUM HAVING A DATA STRUCTURE FOR MANAGING REPRODUCTION OF GRAPHIC DATA AND RECORDING AND REPRODUCING METHODS AND APPARATUSES

(75) Inventors: Kang Soo Seo, Kyunggi-do (KR); Sung Wan Park, Suwon-si (KR); Byung Jin Kim, Kyunggi-do (KR); Soung Hyun Um, Kyunggi-do (KR)

(73) Assignee: LG Electronics, Inc., Seoul (KR)

( * ) Notice: Subject to any disclaimer, the term of this patent is extended or adjusted under 35 U.S.C. 154(b) by 945 days.

(21) Appl. No.: 10/673,210

(22) Filed: Sep. 30, 2003

(65) Prior Publication Data

US 2004/0067048 A1    Apr. 8, 2004

(30) Foreign Application Priority Data

Oct. 4, 2002    (KR) ...................... 10-2002-0060683

(51) Int. Cl.
*H04N 5/00* (2006.01)
*H04N 5/93* (2006.01)
*H04N 5/91* (2006.01)
*G11B 27/00* (2006.01)

(52) U.S. Cl. ........................... 386/125; 386/53; 386/55; 386/95; 386/126

(58) Field of Classification Search ......... 386/125–126, 386/95, 53, 55
See application file for complete search history.

(56) References Cited

U.S. PATENT DOCUMENTS

| | | | |
|---|---|---|---|
| 4,439,759 A | 3/1984 | Fleming et al. | |
| 5,539,716 A | 7/1996 | Furuhashi | |
| 5,636,631 A | 6/1997 | Waitz et al. | |
| 5,748,256 A | 5/1998 | Tsukagoshi | |
| 5,758,007 A | 5/1998 | Kitamura et al. | |
| 5,841,447 A | 11/1998 | Drews | |
| 5,862,300 A | 1/1999 | Yagasaki et al. | |
| 5,912,710 A | 6/1999 | Fujimoto | |
| 5,917,830 A | 6/1999 | Chen et al. | |
| 5,923,627 A | 7/1999 | Miwa et al. | |
| 5,929,857 A | 7/1999 | Dinallo et al. | |
| 5,963,704 A | 10/1999 | Mimura et al. | |
| 5,999,160 A | 12/1999 | Kitamura et al. | |
| 6,009,234 A | 12/1999 | Taira et al. | |
| 6,035,055 A | 3/2000 | Wang et al. | |

(Continued)

FOREIGN PATENT DOCUMENTS

CN    1151586    6/1997

(Continued)

OTHER PUBLICATIONS

ETS300743, Digital Video Broadcasitng (DVB) Subtitle Systems, Sep. 1997.*

(Continued)

*Primary Examiner*—Thai Tran
*Assistant Examiner*—Daquan Zhao
(74) *Attorney, Agent, or Firm*—Harness, Dickey & Pierce, P.L.C.

(57) ABSTRACT

The recording medium includes a data area storing one or more graphic segments, each of which includes graphic data, multiplied with other data.

25 Claims, 20 Drawing Sheets

U.S. PATENT DOCUMENTS

| | | | |
|---|---|---|---|
| 6,044,408 A | 3/2000 | Engstrom et al. | |
| 6,046,778 A | 4/2000 | Nonomura et al. | |
| 6,072,832 A | 6/2000 | Katto | |
| 6,088,507 A | 7/2000 | Yamauchi et al. | |
| 6,112,011 A | 8/2000 | Hisatomi | |
| 6,115,529 A | 9/2000 | Park | |
| 6,134,383 A | 10/2000 | Kikuchi et al. | |
| 6,167,189 A | 12/2000 | Taira et al. | |
| 6,167,192 A | 12/2000 | Heo | |
| 6,167,410 A | 12/2000 | Imamura | |
| 6,204,883 B1 | 3/2001 | Tsukagoshi | |
| 6,226,446 B1 | 5/2001 | Murase et al. | |
| 6,233,393 B1 | 5/2001 | Yanagihara et al. | |
| 6,246,402 B1 | 6/2001 | Setogawa et al. | |
| 6,246,790 B1 | 6/2001 | Huang et al. | |
| 6,286,001 B1 | 9/2001 | Walker et al. | |
| 6,330,210 B1 | 12/2001 | Weirauch et al. | |
| 6,335,742 B1 | 1/2002 | Takemoto | |
| 6,366,732 B1 | 4/2002 | Murase et al. | |
| 6,393,196 B1 | 5/2002 | Yamane et al. | |
| 6,430,311 B1 | 8/2002 | Kumada | |
| 6,433,801 B1 | 8/2002 | Moon et al. | |
| 6,445,877 B1 * | 9/2002 | Okada et al. | 386/95 |
| 6,470,460 B1 | 10/2002 | Kashiwagi et al. | |
| 6,483,983 B1 | 11/2002 | Takahashi et al. | |
| 6,504,996 B1 | 1/2003 | Na et al. | |
| 6,539,166 B2 | 3/2003 | Kawamura et al. | |
| 6,546,188 B1 * | 4/2003 | Ishii et al. | 386/52 |
| 6,553,180 B1 * | 4/2003 | Kikuchi et al. | 386/95 |
| 6,574,417 B1 | 6/2003 | Lin et al. | |
| 6,707,459 B1 | 3/2004 | Graves et al. | |
| 6,711,287 B1 | 3/2004 | Iwasaki | |
| 6,724,981 B1 | 4/2004 | Park et al. | |
| 6,728,477 B1 | 4/2004 | Watkins | |
| 6,754,435 B2 * | 6/2004 | Kim | 386/69 |
| 6,792,154 B1 | 9/2004 | Stewart | |
| 6,847,777 B1 | 1/2005 | Nakamura | |
| 6,850,228 B1 | 2/2005 | Parks et al. | |
| 6,871,008 B1 | 3/2005 | Pintz et al. | |
| 6,889,001 B1 | 5/2005 | Nikaido et al. | |
| 7,072,401 B2 * | 7/2006 | Kim et al. | 375/240.25 |
| 7,167,637 B2 | 1/2007 | Mori et al. | |
| 7,236,687 B2 * | 6/2007 | Kato et al. | 386/95 |
| 2001/0036322 A1 | 11/2001 | Bloomfield et al. | |
| 2001/0052127 A1 | 12/2001 | Seo et al. | |
| 2002/0006165 A1 * | 1/2002 | Kato | 375/240.25 |
| 2002/0006273 A1 * | 1/2002 | Seo et al. | 386/96 |
| 2002/0089516 A1 | 7/2002 | Sobol | |
| 2002/0145702 A1 | 10/2002 | Kato et al. | |
| 2002/0174430 A1 | 11/2002 | Ellis et al. | |
| 2002/0194618 A1 | 12/2002 | Okada et al. | |
| 2003/0152365 A1 | 8/2003 | Nagayama | |
| 2003/0179900 A1 | 9/2003 | Tian et al. | |
| 2004/0047591 A1 | 3/2004 | Seo et al. | |
| 2006/0045481 A1 | 3/2006 | Yahata et al. | |
| 2006/0064716 A1 | 3/2006 | Sull et al. | |
| 2006/0143666 A1 | 6/2006 | Okada et al. | |
| 2006/0153535 A1 | 7/2006 | Chun et al. | |
| 2006/0165388 A1 | 7/2006 | Uesaka et al. | |
| 2006/0188223 A1 | 8/2006 | Ikeda et al. | |
| 2006/0282775 A1 | 12/2006 | Yahata et al. | |
| 2007/0057969 A1 | 3/2007 | McCrossan et al. | |
| 2007/0133948 A1 | 6/2007 | Kikuchi et al. | |

FOREIGN PATENT DOCUMENTS

| | | |
|---|---|---|
| CN | 1167311 | 12/1997 |
| CN | 1103102 | 3/1998 |
| CN | 1177172(A) | 3/1998 |
| CN | 1251461 | 4/2000 |
| CN | 1242575 | 1/2003 |
| CN | 1745579 A | 3/2006 |
| CN | 101026775 A | 8/2007 |
| EP | 0 677 954 | 10/1995 |
| EP | 0724264 | 7/1996 |
| EP | 0 725 541 | 8/1996 |
| EP | 1156377 | 8/1997 |
| EP | 0831647 | 3/1998 |
| EP | 0913822 | 5/1999 |
| EP | 1021048 * | 7/2000 |
| EP | 1223580 | 7/2002 |
| EP | 1 229 542 | 8/2002 |
| EP | 1 608 165 A1 | 12/2005 |
| EP | 0 898 279 B1 | 6/2006 |
| EP | 1 868 190 A2 | 12/2007 |
| JP | 6319125 | 11/1994 |
| JP | 08-265661 | 10/1996 |
| JP | 08-275205 | 10/1996 |
| JP | 8298554 | 11/1996 |
| JP | 8329004 | 12/1996 |
| JP | 8339663 | 12/1996 |
| JP | 09-081118 | 3/1997 |
| JP | 10-028273 A | 1/1998 |
| JP | 10-210504 A | 8/1998 |
| JP | 10-215409 | 8/1998 |
| JP | 11-018048 | 1/1999 |
| JP | 1999-185463 | 7/1999 |
| JP | 11-234622 A | 8/1999 |
| JP | 11-298860 | 10/1999 |
| JP | 2000-023082 | 1/2000 |
| JP | 2000-083216 | 3/2000 |
| JP | 2000-100073 | 4/2000 |
| JP | 2000-132953 | 5/2000 |
| JP | 2000-165361 | 6/2000 |
| JP | 2000-222861 | 8/2000 |
| JP | 2000-261802 | 9/2000 |
| JP | 2001-184839 | 7/2001 |
| JP | 2001-312880 | 11/2001 |
| JP | 2002-056651 | 2/2002 |
| JP | 2002-067533 | 3/2002 |
| JP | 2002-153684 | 5/2002 |
| JP | 2002-344805 | 11/2002 |
| JP | 2003-009096 | 1/2003 |
| KR | 1994-0016014 | 3/1997 |
| KR | 1996-0025645 | 8/1997 |
| KR | 2001-0111247 | 12/2001 |
| KR | 2002-0064463 | 8/2002 |
| RU | 2129758(C1) | 4/1999 |
| WO | WO 97/06635 | 2/1997 |
| WO | WO 00/30357 | 5/2000 |
| WO | WO 00/30358 | 5/2000 |
| WO | WO 00/31980 | 6/2000 |
| WO | WO 00/36600 | 6/2000 |
| WO | WO 00/060598 | 10/2000 |
| WO | WO 2004/029960 | 4/2004 |
| WO | WO 2004/047430 | 6/2004 |
| WO | WO 2004/098193 | 11/2004 |
| WO | WO 2004/098193 A2 | 11/2004 |
| WO | WO 2004/114658 | 12/2004 |
| WO | WO 2005/002220 | 1/2005 |
| WO | WO 2005/052941 | 6/2005 |
| WO | WO 2005/078727 | 8/2005 |

OTHER PUBLICATIONS

Russian Office Action dated Sep. 14, 2007.
Chinese Search Report dated Jun. 9, 2007.
"Digital Video Broadcasting (DVB); Subtitling systems", Final Draft ETSI EN 300 743 V1.2.1 (Jun. 2002), ETSI, Jun. 2002.
Office Action for corresponding Russian application dated May 5, 2008.
P.A. Sarginson, the Institution of Electrical Engineers, MPEG-2: A Tutorial Introduction to the Systems Layer, Report of EP 04 74 8368.0, 1995 (13 pages).

Supplementary European Search Report completion on Aug. 22, 2008 dated Sep. 1, 2008.
Digital Video Broadcasting (DVB); Subtitling Systems, Final Draft ETSI EN 300 743 V1.2.1 (Jun. 2002) (48 pages).
European Search Report completion on Aug. 19, 2008 dated Sep. 1, 2008.
Chinese Office Action dated Aug. 1, 2008.
Chinese Office Action dated Feb. 27, 2009.
Japanese Office Action dated Feb. 17, 2009.
Russian Notice of Allowance dated Feb. 27, 2009.
Chinese Office Action dated Apr. 10, 2009.
Search Report by European Patent Office dated Oct. 8, 2009 for counterpart European Application No. 03799198.1.
Office Action dated Jan. 26, 2010 by Japanese Patent Office for counterpart Japanese Application No. 2006-507814, with English translation.
Office Action dated Jan. 22, 2010 by USPTO for counterpart U.S. Appl. No. 10/488,347.
Search Report for European patent application No. 03799199.9 dated May 26, 2009.
Office Action for Japanese patent application No. 2004-541314 dated Jun. 23, 2009 (with English translation).
Office Action for Japanese patent application No. 2006-507826 dated Apr. 30, 2010.

* cited by examiner

FIG. 15

```
PlayListMark() {
    length
    number_of_PlayList_marks
    for (i=0; i<number_of_PlayList_marks; i++) {
        .....
        mark_type
        .....
        mark_time_stamp
        if (mark_type==0x01 || mark_type==0x02)
        ref_to_menu_thumbnail_index
        else if (mark_type > 0x02 && mark_type < 0x06)
            ref_to_mark_thumbnail_index
        else
            ref_to_graphic_start_index
        duration
        makers_information
        mark_name
        }
        if (mark_type == 0x13) {
            number_of_graphic_images
            for (i=0; i<number_of_graphic_images; i++) {
                ref_to_graphic_image_index
                display_timing_info
                display_info
                display_effect
            }
        }
    }
}
```

FIG. 16

```
PlayList_File() {
    .....
    version_number
    .....
    PlayList()
    PlayListMark()
    MakersPrivateData()
    PlayListGraphicIndicator()
}
```

```
PlayListGraphicIndicator() {
    length
    number_of_Graphic_Display_positions
    for (id=0; id<number_of_Graphic_Display_positions; id++) {
        .....
        graphic_display_start_time_stamp
        duration
        number_of_graphic_images
        for (i=0; i<number_of_graphic_images; i++) {
            ref_to_graphic_image_index
            display_timing_info
            display_info
            display_effect
        }
    }
}
```

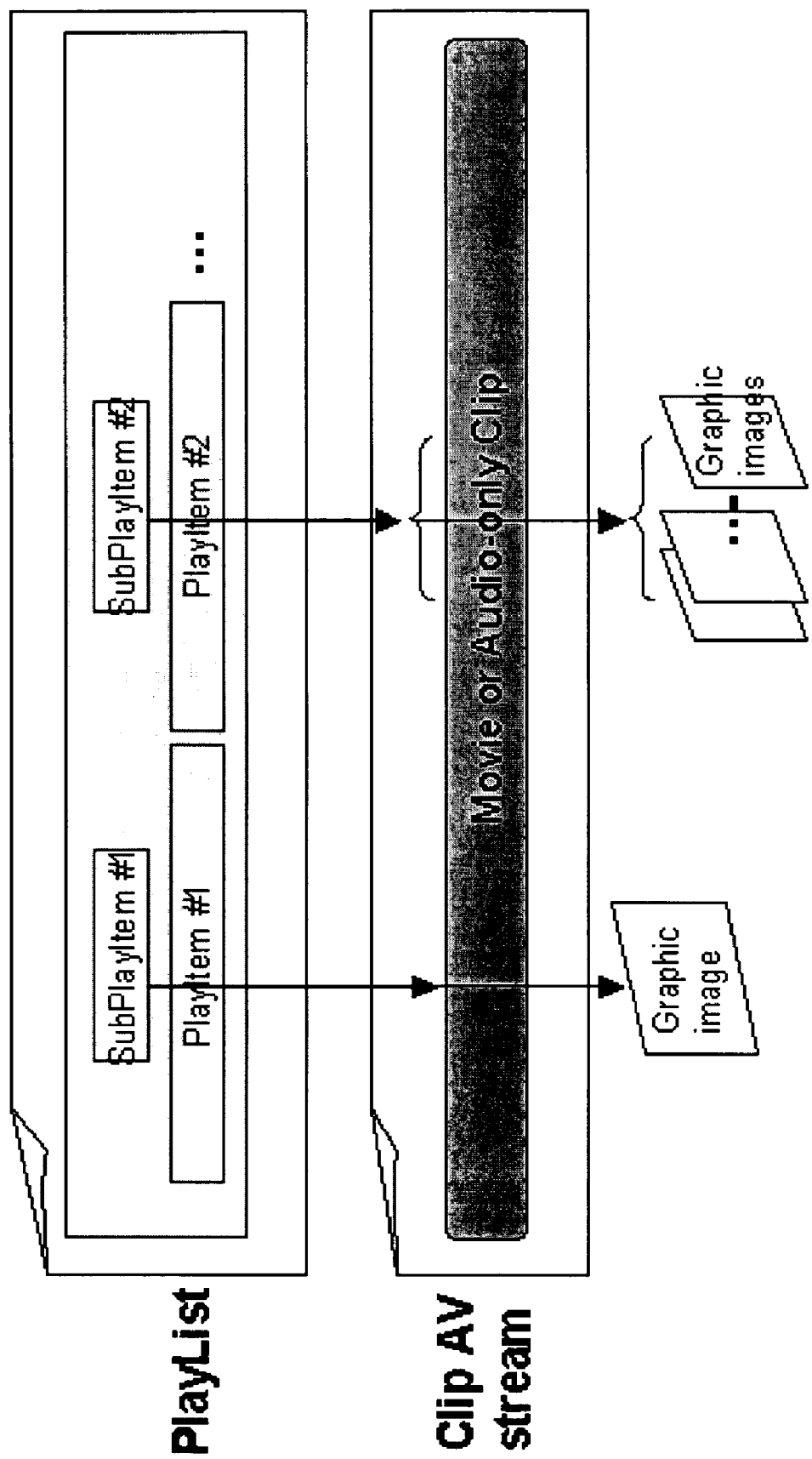

FIG. 18

```
SubPlayItem() {
    length
    Clip_Information_file_name
    Clip_codec_identifier
    SubPlayItem_type
    ref_to_STC_id
    SubPlayItem_IN_time
    SubPlayItem_OUT_time
    sync_PlayItem_id
    sync_start_PTS_of_PlayItem
    if (<Graphic-Image>) {
        number_of_graphic_images
        for (i=0; i<number_of_graphic_images; i++) {
            ref_to_graphic_image_index
            display_timing_info
            display_info
            display_effect
        }
    }
}
```

FIG. 19

```
Still_Image_Info () {
    ......
    Graphic_Display_Info ()
    ......
}
```

```
Graphic_Display_Infor() {
    length
    number_of_graphic_images
    for (i=0; i<number_of_graphic_images; i++) {
        ref_to_graphic_image_index
        display_timing_info
        display_info
        display_effect
    }
}
```

FIG. 20

```
Menu_Info () {
    .....
        Button_1_Info ( )
        Button_2_Info ( )
    .....
        Button_N_Info ( )
    .....
}
```

```
Button_N_Info() {
    length
    .....
    ref_to_graphic_image_index
    display_timing_info
    display_info
    display_effect
    .....
}
```

RECORDING MEDIUM HAVING A DATA STRUCTURE FOR MANAGING REPRODUCTION OF GRAPHIC DATA AND RECORDING AND REPRODUCING METHODS AND APPARATUSES

FOREIGN PRIORITY

The present invention claims priority under 35 U.S.C. 119 on Korean Application No. 10-2002-060683 filed Oct. 4, 2002; the contents of each above-cited Korean applications are incorporated by reference in their entirety.

BACKGROUND OF THE INVENTION

1. Field of the Invention

The present invention relates to a method of managing graphic data for a high-density recording medium such as an optical disk (e.g., a Blu-ray Disc ROM (BD-ROM)).

2. Description of Related Art

Recording media such as optical disks capable of recording large amounts of high-quality digital video/audio data, for example, DVDs (digital versatile disks) are now commercially available on the market. The types of DVDs include DVD-Video, DVD-VR (Video Recording), DVD-Audio, and DVD-AR (Audio Recording).

In the DVD-Video, graphic data to be reproduced in synchronization with a video/audio data stream is defined by the DVD-private format and designated as sub-pictures.

A sub-picture of the graphic data is of size 720×480 pixels and has a palette with 2-bit color depth, which can support up to 16 colors. The graphic data is recorded on the DVD after being multiplexed with the video/audio stream.

A run-length coding method according to the DVD-Video standard is applied to the graphic data in which display control information about sub-picture data is included. The display control information includes information on display timing, color change, blending ratio change, display position, size selection, etc.

Operations for providing various graphic effects to the graphic data, such as scroll-up/down, fade/wipe-in/out, and color change, can be performed selectively on a time basis. Navigation information for the palette information is defined for each title and program chain and includes information on 16 colors and the number and attributes of sub-pictures.

The attributes of sub-pictures may include caption information, director's comments, and aspect ratio information for various applications as well as coding mode information and language information.

An optical disk reproducing apparatus such as a DVD player displays the main video image and some or all of the graphic image of a sub-picture unit (SPU) as shown in FIG. 1 by blending the images using navigation information, wherein the graphic image of the sub-picture unit (SPU) is overlaid on the main video image on a presentation time basis.

As shown in FIG. 2, sub-picture packs (SP_PCKs) are recorded intermittently among audio packs (Audio_PCKs) and video packs (Video_PCKs) recorded successively. Each of the audio and video packs is of size 2048 bytes.

During data reproduction, the sub-picture packs are read and then grouped into a sub-picture unit (SPU), which includes a sub-picture unit header, pixel data, and display control information.

The sub-picture unit header includes the data size of the sub-picture unit. The pixel data includes 2-bit depth bitmap data encoded by the run-length coding method. The palette information for the pixel data is recorded as separate navigation information.

The optical disk reproducing apparatus reproduces the pixel data along with the audio and video data, the pixel data being synchronized with the audio and video data. As alluded to above, the apparatus displays the main video image and some or all of the graphic image of a sub-picture unit (SPU) by blending the images using the navigation information, wherein the graphic image of the sub-picture unit (SPU) is overlaid on the main video image in various ways on a presentation time basis.

The standardization for high-density read-only optical disks such as the Blu-ray disc ROM (BD-ROM) is still under way. A method for effective managing graphic data recorded on the high-density read-only optical disk such as a BD-ROM is not yet available.

SUMMARY OF THE INVENTION

The recording medium according to the present invention includes a data structure for managing reproduction of graphic data.

In one exemplary embodiment, a data area of the recording medium includes one or more graphic segments, each of which includes graphic data, multiplied with other data. For example, the other data includes movie data. Each graphic segment includes a plurality of transport packets.

In one exemplary embodiment, each transport packet in a graphic segment has a same packet identifier (PID).

In another exemplary embodiment, at least one transport packet in a graphic segment includes an identifier that the transport packet is part of a graphics packet.

In a further exemplary embodiment, at least one transport packet in the a graphic segment includes a time stamp.

In a still further exemplary embodiment, at least one transport packet in a graphic segment includes graphic information for managing reproduction of graphic images.

The present invention further provides apparatuses and methods for recording and reproducing the data structure according to the present invention.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIGS. 14-20 illustrate exemplary embodiments of navigation information in accordance with the invention.

DETAILED DESCRIPTION OF THE EXEMPLARY EMBODIMENTS

In order that the invention may be fully understood, exemplary embodiments thereof will now be described with reference to the accompanying drawings.

Figure 1:
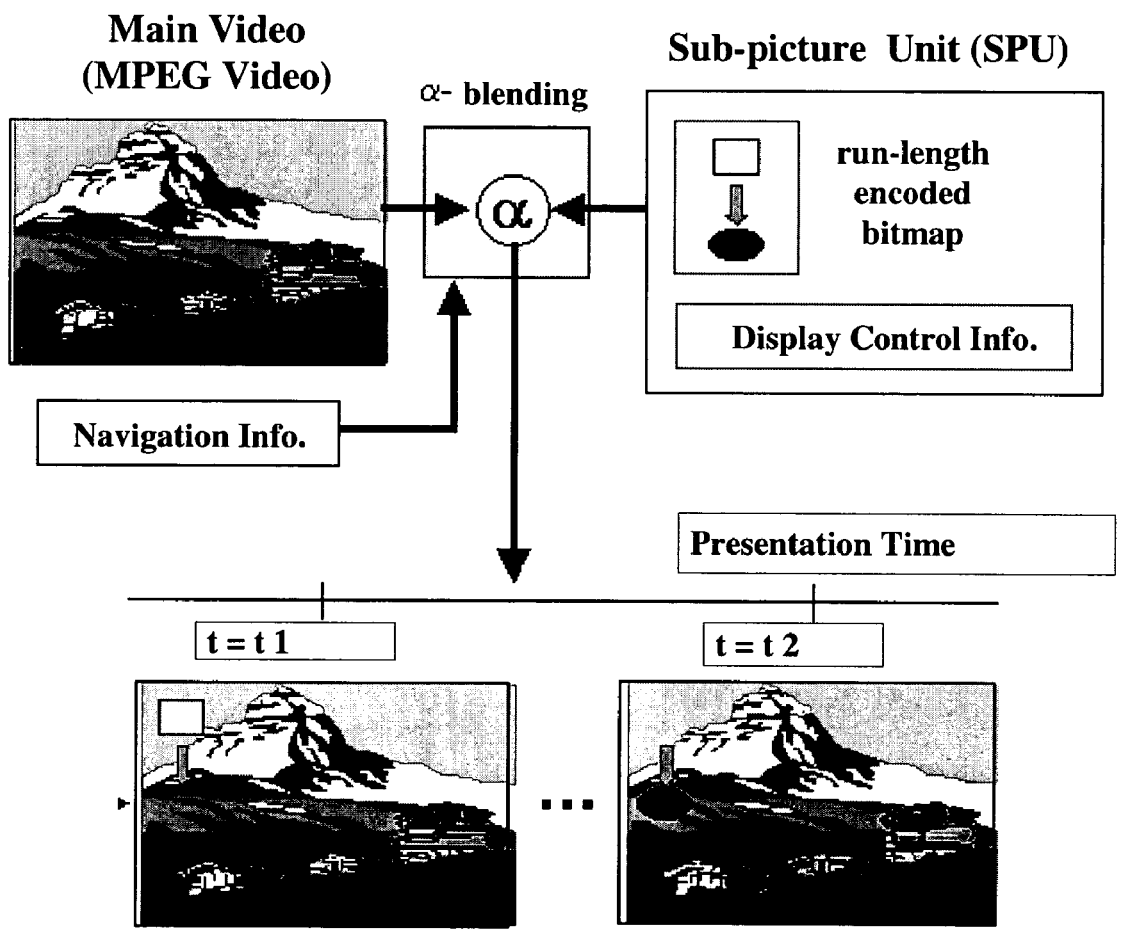
FIG. 1 illustrates a graphical representation of main video overlaid with graphic images according to the DVD-Video standard.
Figure 2:
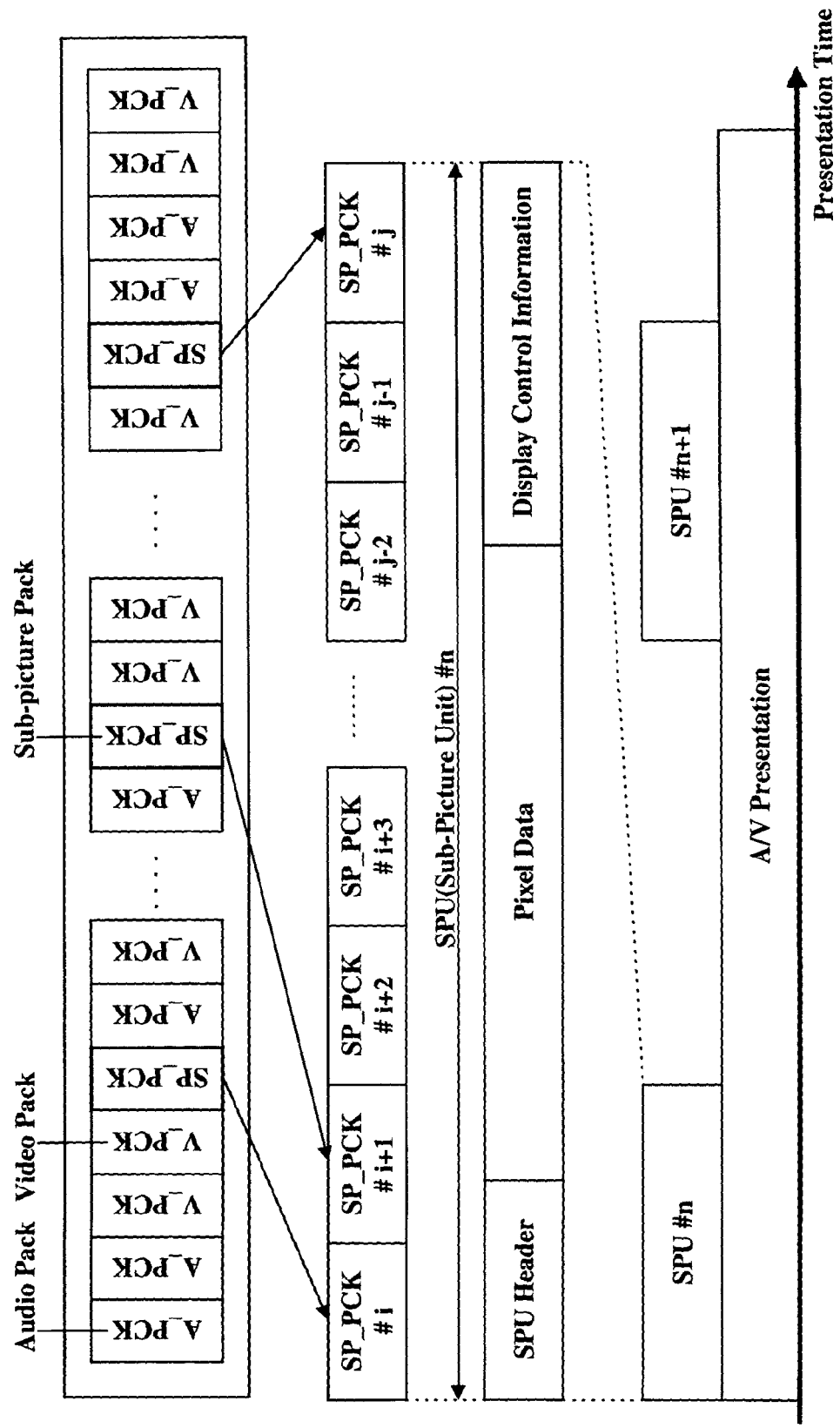
FIG. 2 illustrates a structure of graphic data in the DVD-Video standard.
Figure 3:
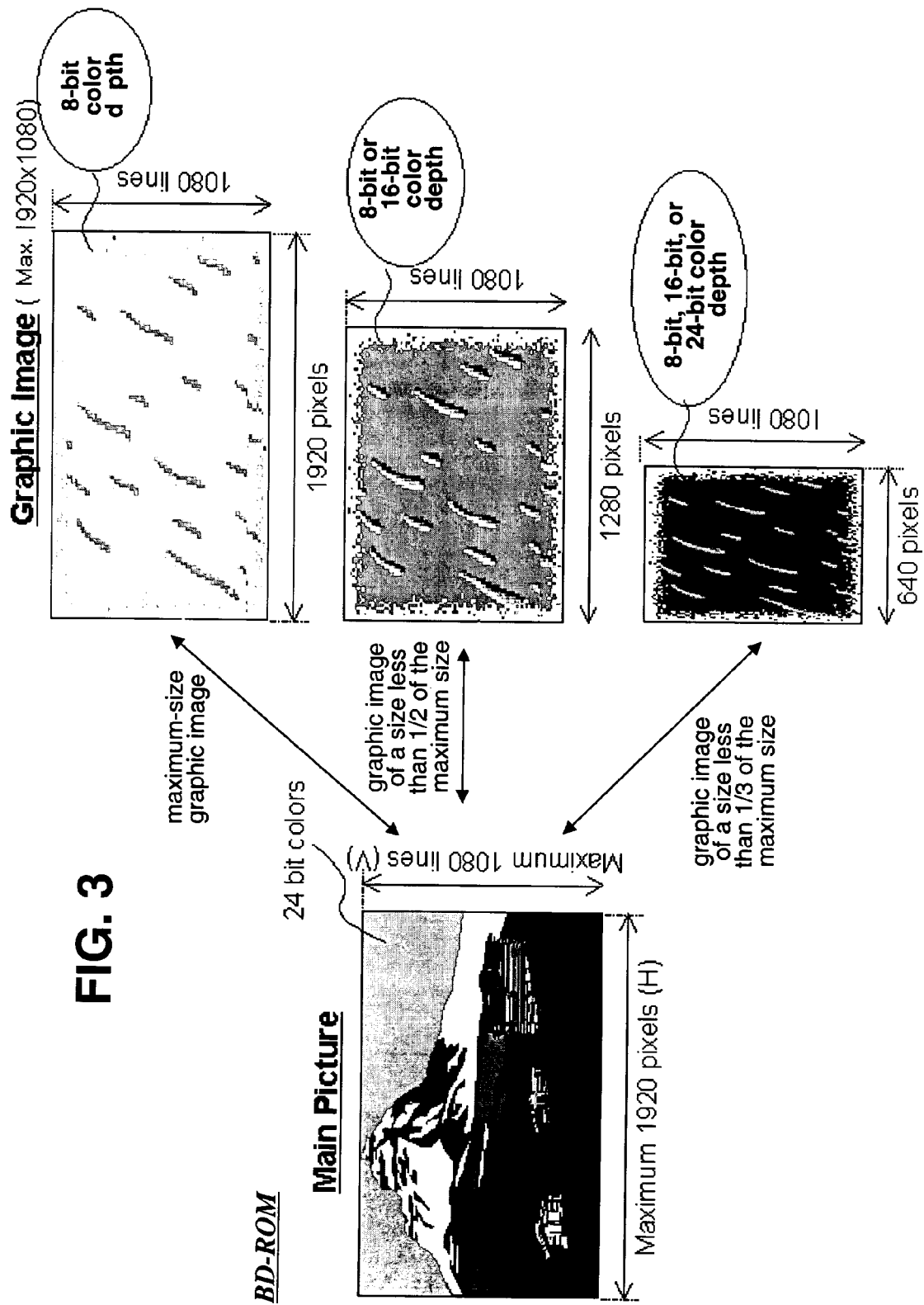
FIG. 3 illustrates a graphical representation of a plurality of graphic images of different sizes and color depths to be overlaid on a main picture according to the present invention.

FIG. 3 is a graphical representation of an embodiment of a method of managing graphic data for a high-density optical disk in accordance with the present invention. A main picture image has one or more corresponding graphic images, which have different sizes and color depths.

As shown, the main picture of size 1920×1080 pixels has three different associated graphic images, a graphic image of size 1920×1080 pixels, a graphic image of size 1280×1080 pixels, and a graphic image of size 640×1080 pixels.

The three graphic images have different color depths. The 1920×1080 graphic image has an 8-bit color depth, the 1280×1080 graphic image has an 8-bit or 16-bit color depth, and the 640×1080 graphic image has an 8-bit, 16-bit, or 24-bit color depth.

Figure 4:
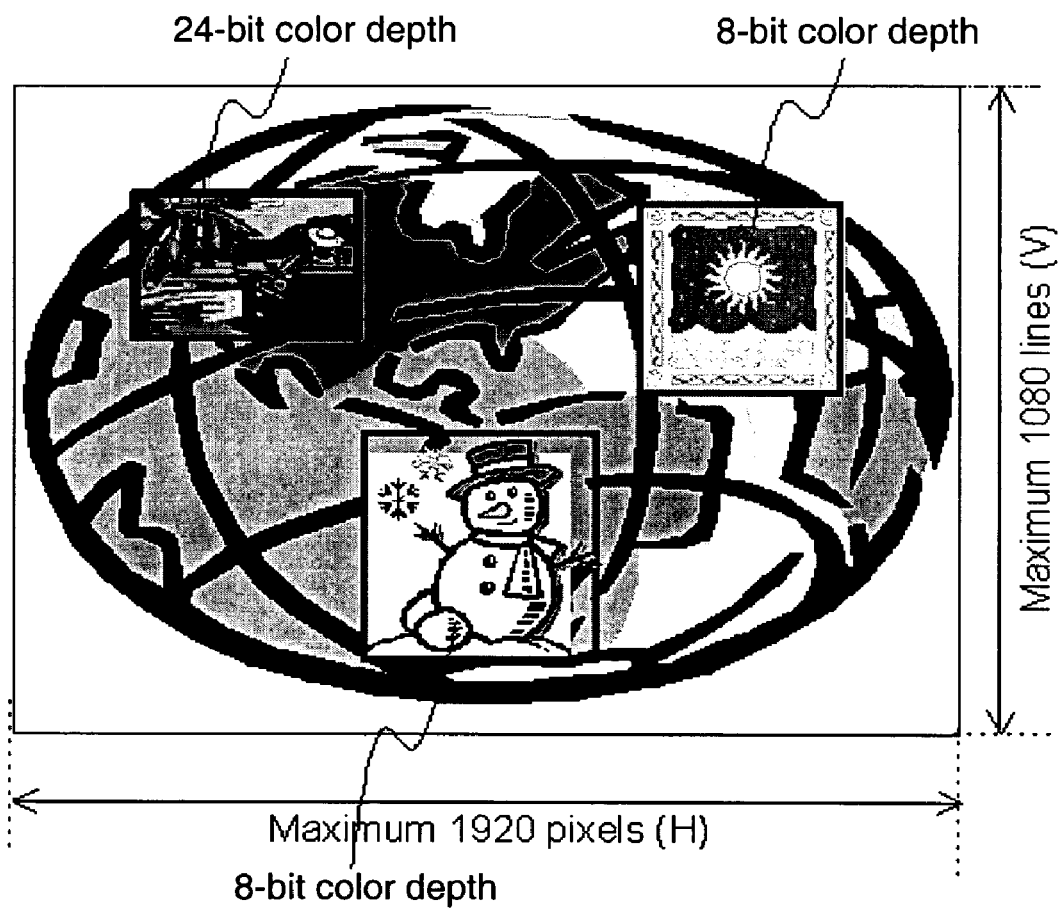
FIG. 4 illustrates a graphical representation of a main data overlaid with a plurality of graphic images of different sizes and color depths.

As shown in FIG. 4, a plurality of different graphic images, graphic images 1, 2, and 3, may be simultaneously overlaid on one main picture image and the plurality of graphic images may have different sizes and color depths. The plurality of graphic images may be managed individually or as a group.

The overlaid graphic images and navigation information therefor are multiplexed with main video and audio streams, which will be described in detail below.

Figure 5:
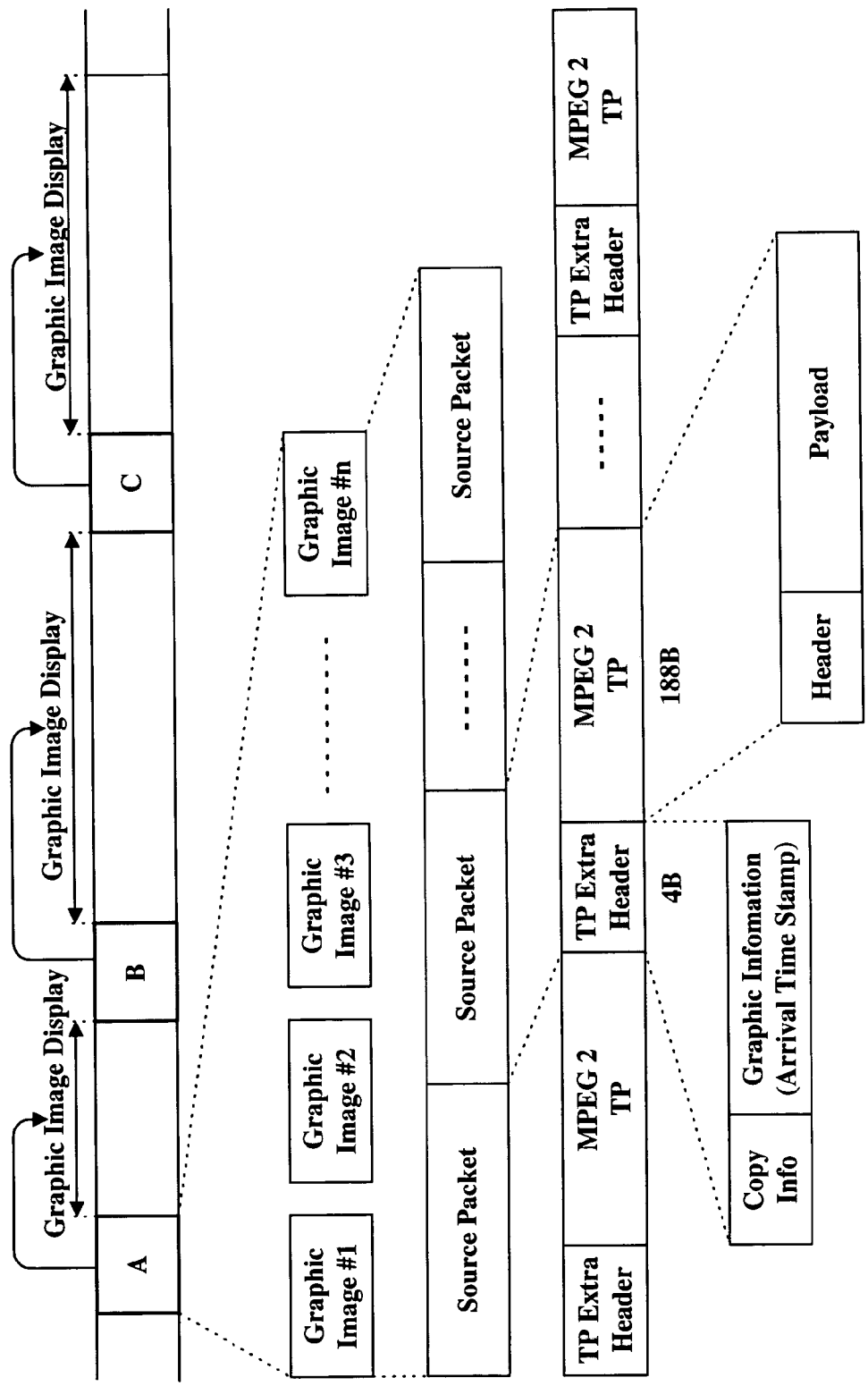
FIGS. 5-8 illustrate examples showing how graphic images and navigation information are recorded in a main stream on a high density recording medium according to the present invention.

FIGS. 5-8 illustrate examples showing how graphic images and navigation information are recorded in a main stream on a high density recording medium such as a BD-ROM. As shown in FIG. 5, multiple graphic images are recorded in a prescribed recording segment (e.g., A, B, or C) of an audio/video main stream recorded in a data area of a BD-ROM. The multiple graphic images are multiplexed in the prescribed segment.

Graphic images recorded in the prescribed segment, (e.g., A) are graphic images to be overlaid with the main stream recorded after the segment. A graphic image is recorded as a plurality of 192-byte source packets, each comprising a 4-byte TP (Transport Packet) extra header and a 188-byte MPEG2 TP. In the recording segment, only graphic images are recorded or graphic images are multiplexed with the main stream.

The 4-byte TP extra header may include 2-bit copy protection information and 30-bit navigation information for an associated graphic image (e.g., Image_start_end_flag described in detail below) or a 30-bit packet arrival time stamp.

In detail, if a source packet is associated with a graphic image, the TP extra header thereof includes copy protection information and graphic information (e.g., Image_start_end_flag described in detail below). Otherwise, the TP extra header includes copy protection information and a packet arrival time stamp.

The header of an MPEG2 TP includes a packet identifier (PID). The PID is given a unique value, for example, 'PID=0× 1023' when the packet is a graphics packet.

Because graphic images are recorded as MPEG2 TPs in the recording segment, the recording format of the graphic images is compatible with that of movie data, for example, movie data of the BD-RE format. When graphic images and a main stream are multiplexed in the prescribed recording segment, the main stream corresponds to one among MPEG2 movie data, audio data, or still images.

Figure 6:
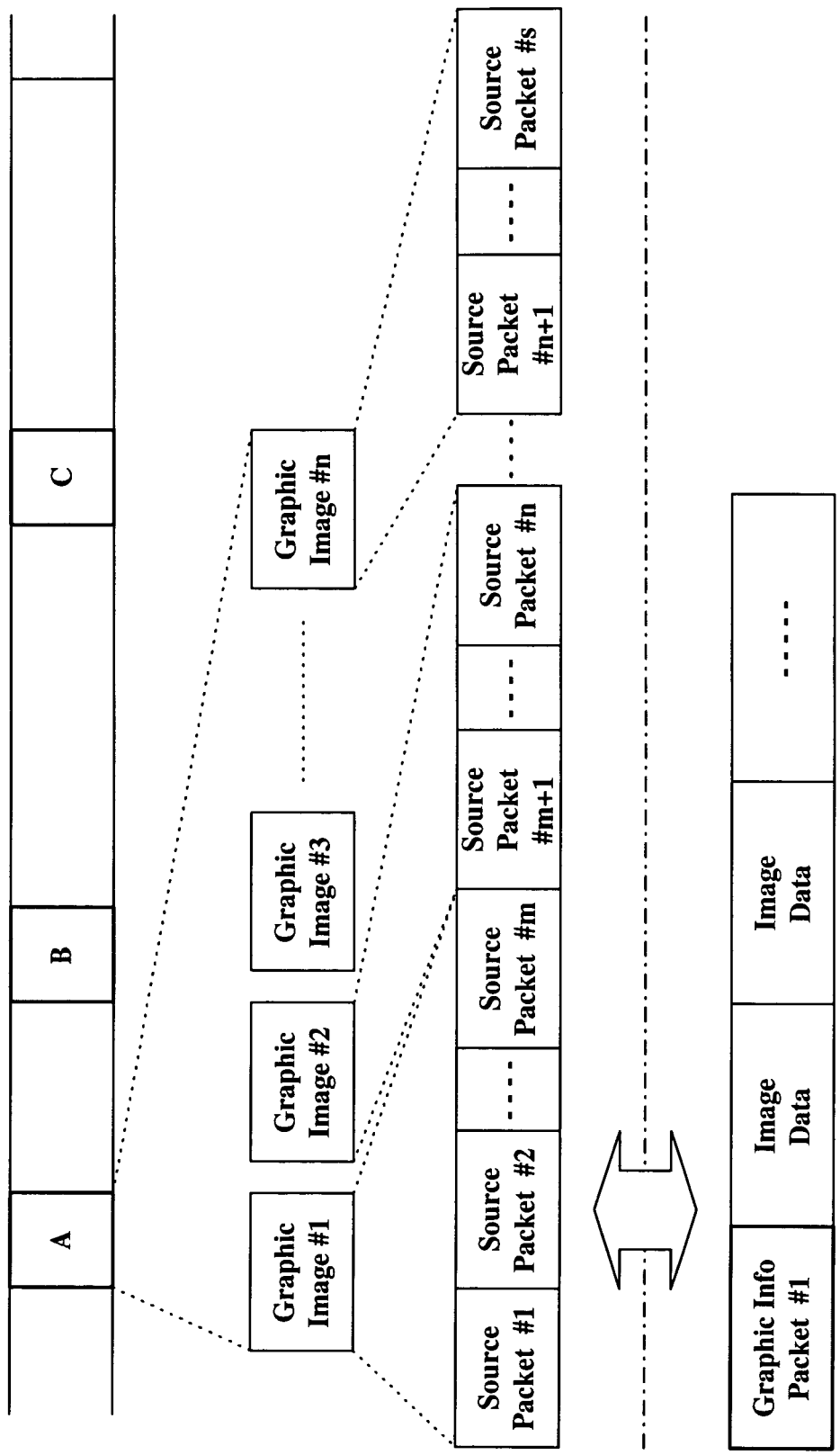

As shown in FIG. 6, the beginning part of the prescribed recording segment includes a source packet of graphic information for managing reproduction of the graphic images recorded therein. An optical disk reproducing apparatus performs reproduction of the graphic images by checking the number of graphic images, data size, etc using the graphic information.

Figure 7:
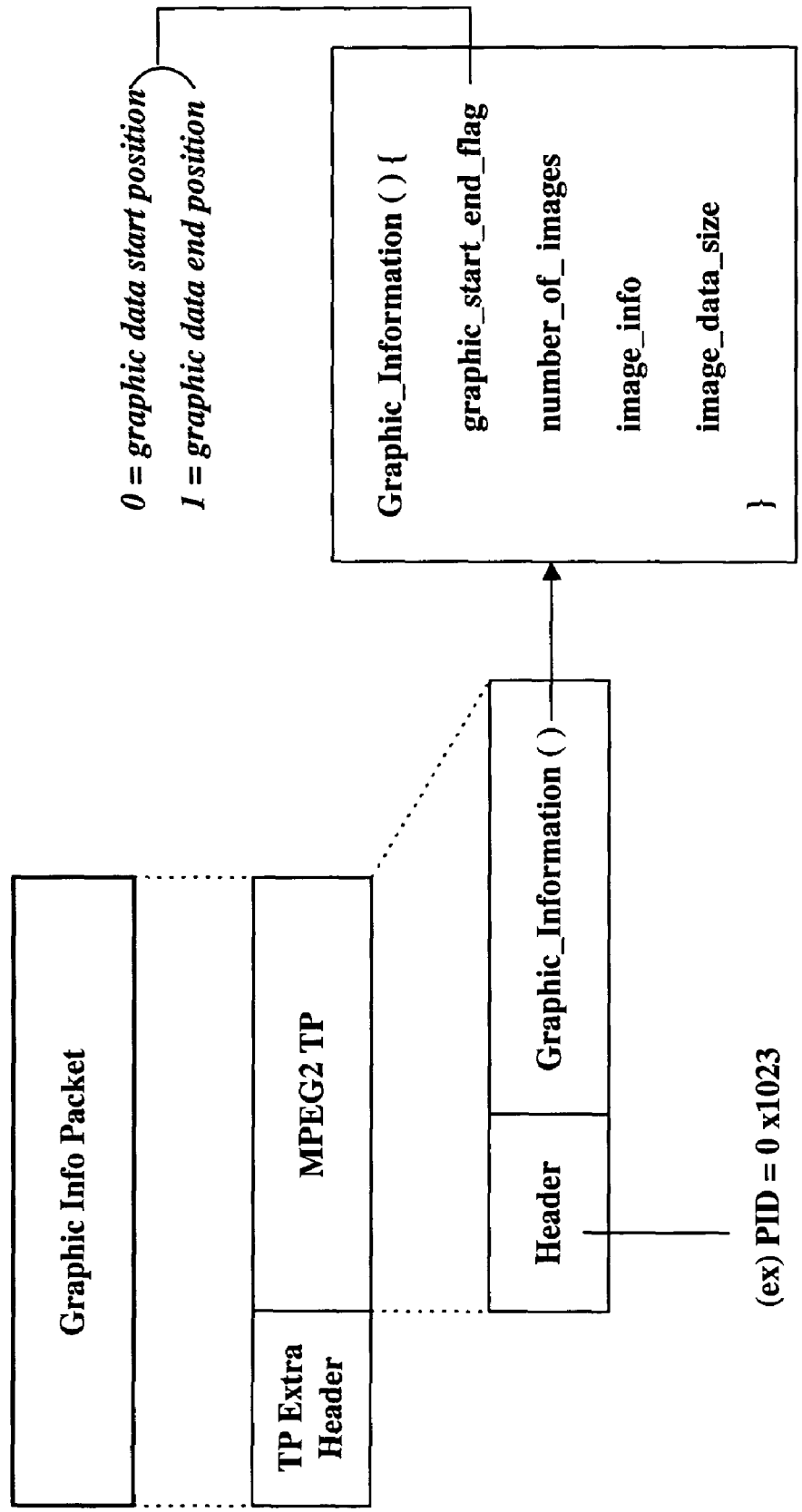

The graphic images recorded in the prescribed recording segment can be identified by the source packet of the graphic information. As shown in FIG. 7, the graphic information contained in the payload of the source packet may include fields of graphic_start_end_flag, number_of_images, image_info indicating attributes and properties of each graphic image (e.g., position to display a graphic image, presentation time to display a graphic image, duration to display a graphic image, etc.), and image_data_size indicating the size of each graphic image or start position information.

If the graphic_start_end_flag field is '0', it indicates the beginning of the graphic data; otherwise it indicates the ending of the graphic data. Some of the fields of the graphic information can be used as information about one graphic image or all of the graphic images.

Figure 8:
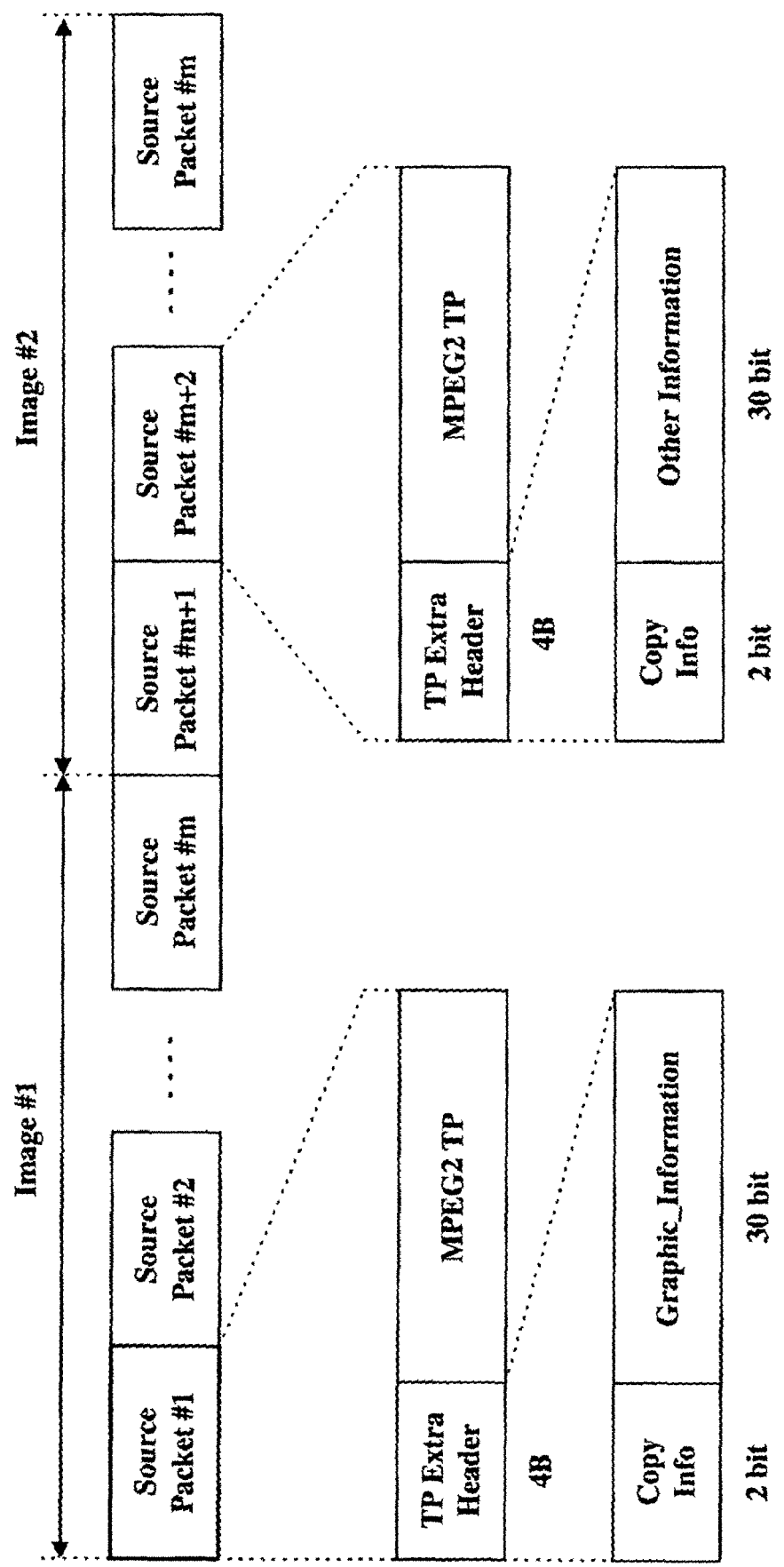

In an example shown in FIG. 8, the graphic images recorded in the prescribed recording segment can be identified by the TP extra header, wherein the TP extra header of the first source packet of each graphic image includes 2-bit copy protection information and 30-bit graphic information. The graphic information can be defined in the same manner as the graphic information shown in FIG. 7.

The TP extra header of the other source packets includes 2-bit copy protection information and other 30-bit information such as a packet arrival time stamp.

Figure 9:
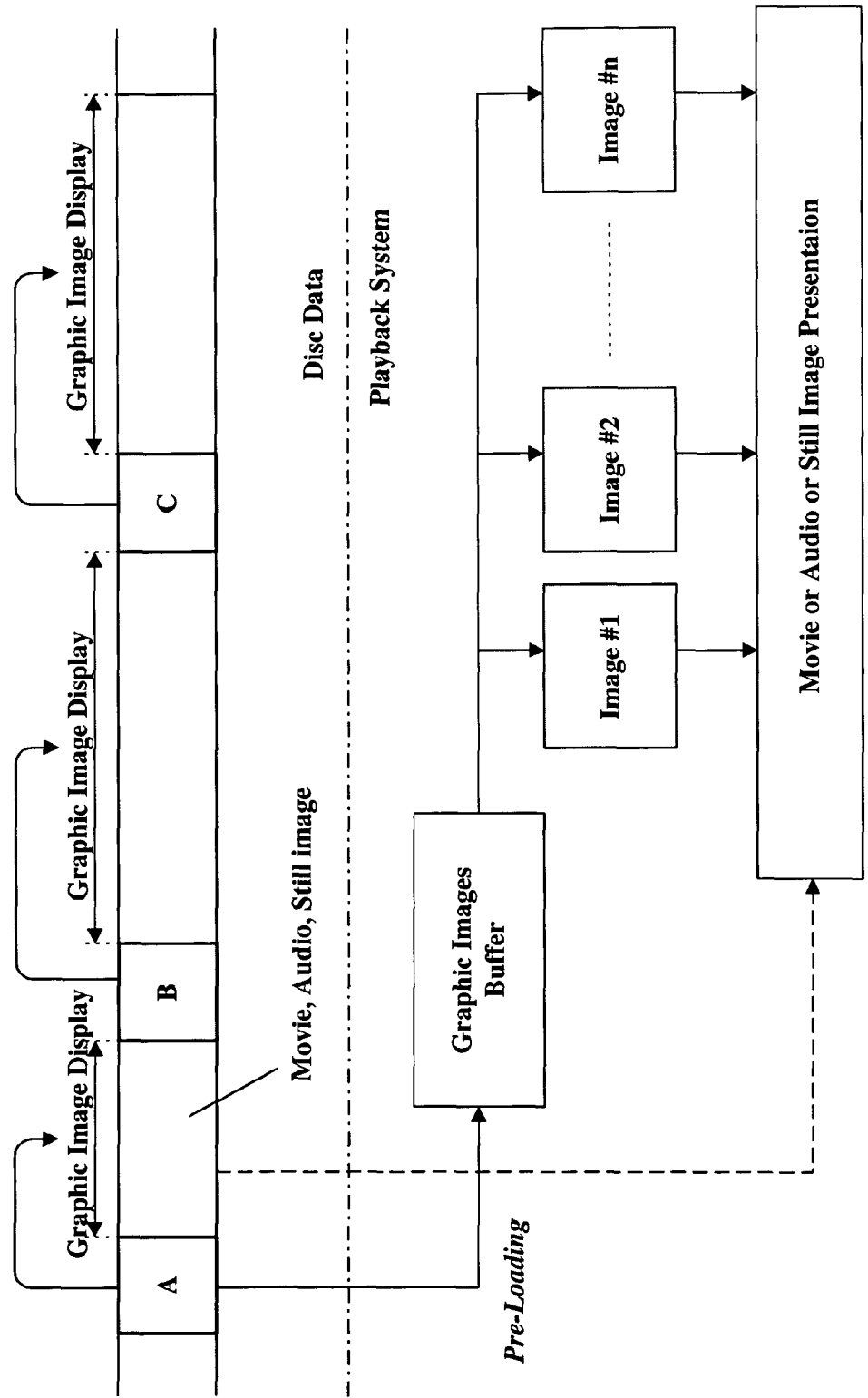
FIG. 9 illustrates a preloading operation for loading graphic data recorded in a segment into a graphic image buffer.

If a high density recording medium such as a BD-ROM disk having graphic images and graphic information recorded in the aforementioned manner is inserted into an optical disk reproducing apparatus, the apparatus conducts a preloading operation that loads all the graphic data recorded in a prescribed segment into a graphic image buffer, as shown in FIG. 9.

When reproducing a main stream (e.g., movie video, audio, or still images) recorded after the prescribed segment, the optical disk reproducing apparatus sequentially reproduces the graphic images in the graphic image buffer along with the main stream using the graphic information as described above with reference to FIG. 7 and FIG. 8.

Figure 10:
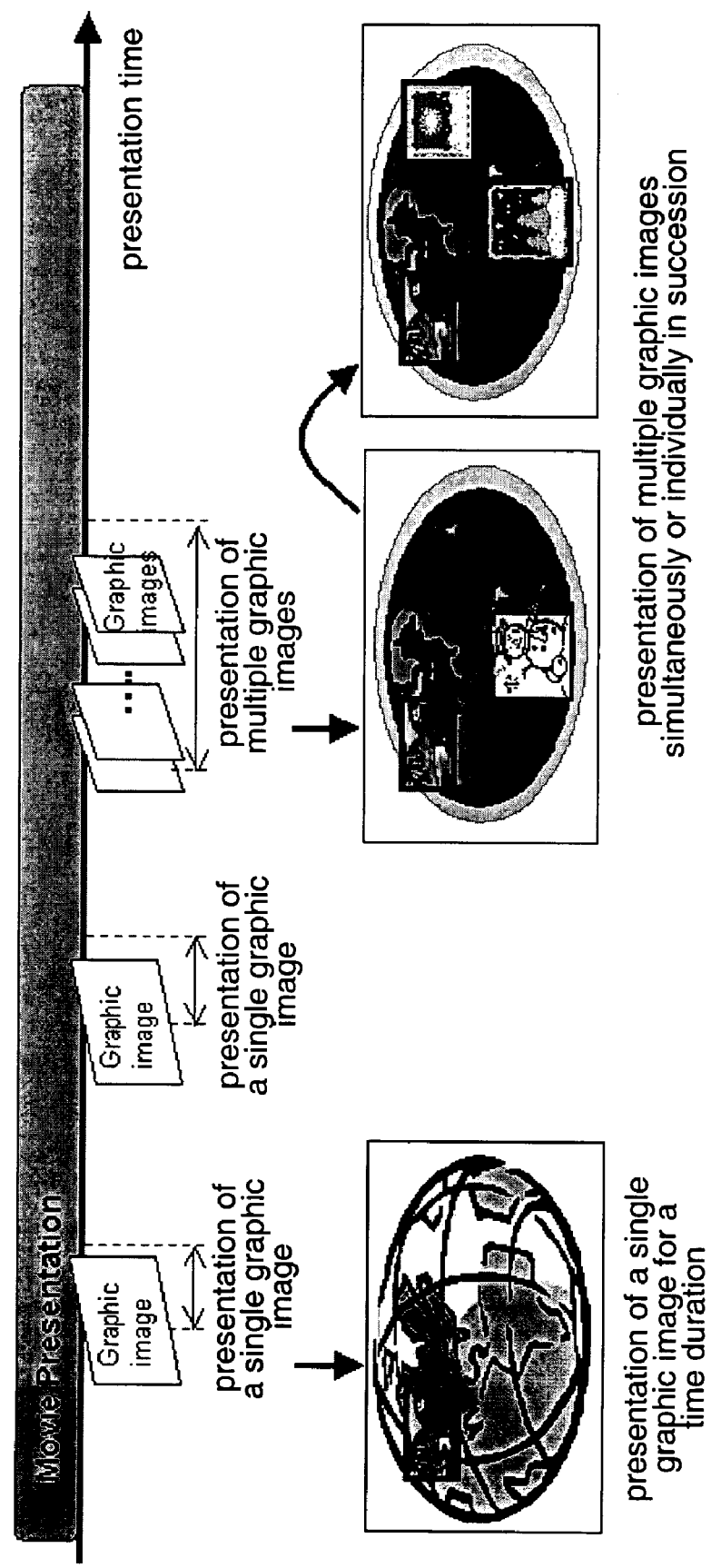
FIGS. 10-13 illustrate exemplary embodiments of graphic information in accordance with the invention.

When the graphic images are reproduced along with a movie as shown in FIG. 10, the graphic images are overlaid on the movie video, wherein the graphic images may be overlaid on the movie video simultaneously or individually in succession and the positions of the graphic images on the movie video may be different from each other.

Figure 11:
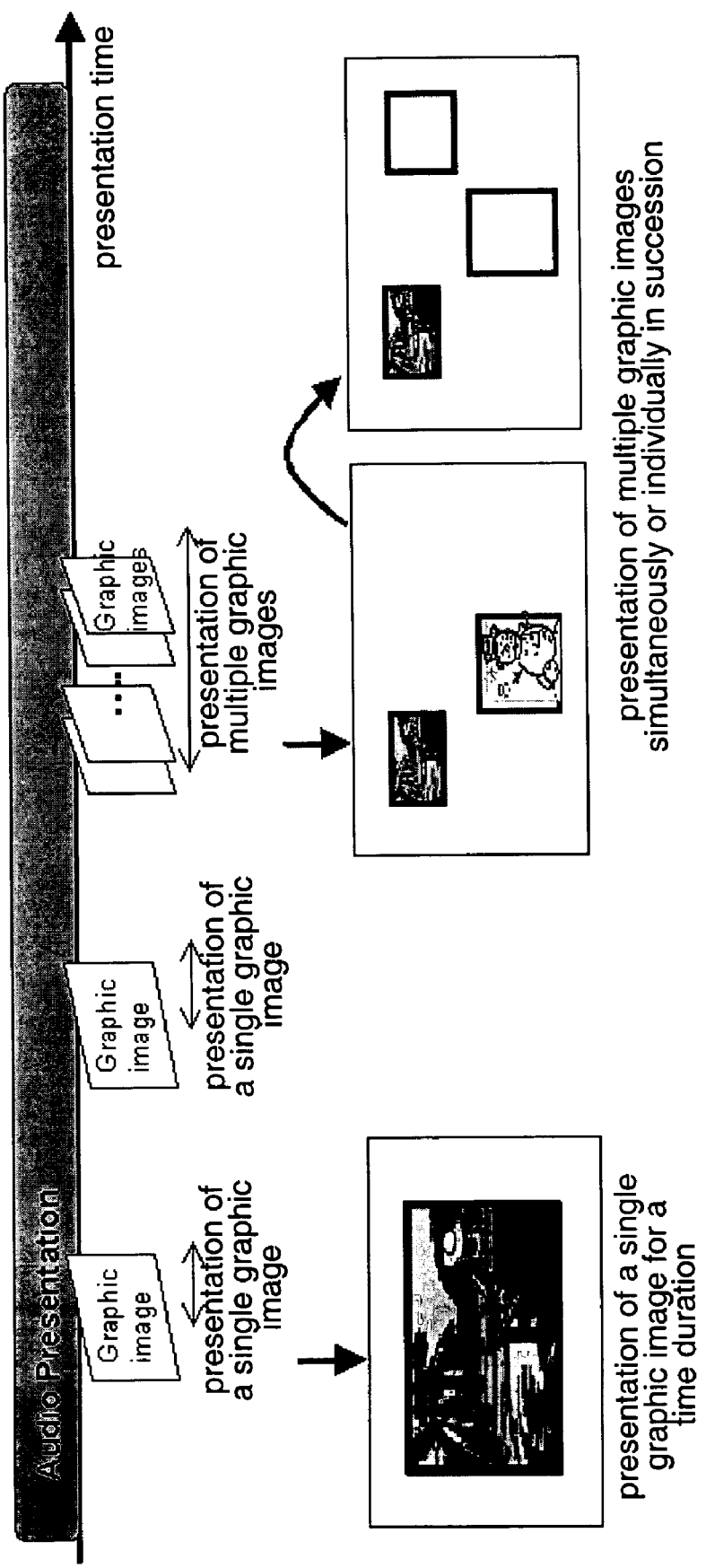

When the graphic images are reproduced along with an audio-only clip as shown in FIG. 11, one or multiple graphic images are displayed at a particular position(s) of the screen, wherein the graphic images may be presented simultaneously or individually in succession as in animations and the positions of the graphic images may be different from each other.

Figure 12:
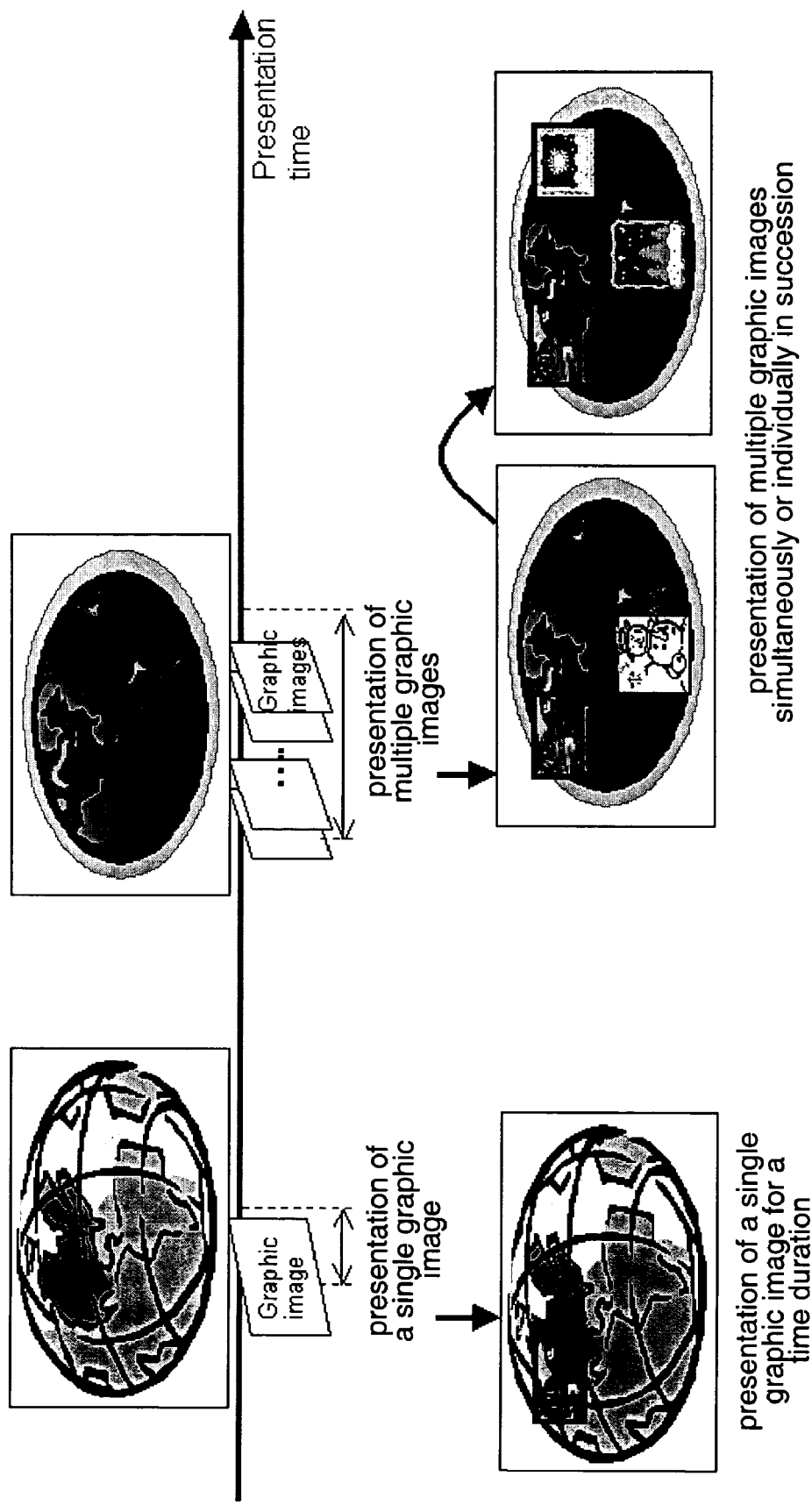

When the graphic images are reproduced along with still images as shown in FIG. 12, the graphic images are overlaid on the still images, wherein the graphic images may be overlaid on one still image simultaneously or individually in succession and the positions of the graphic images on the still images may be different from each other.

Figure 13:
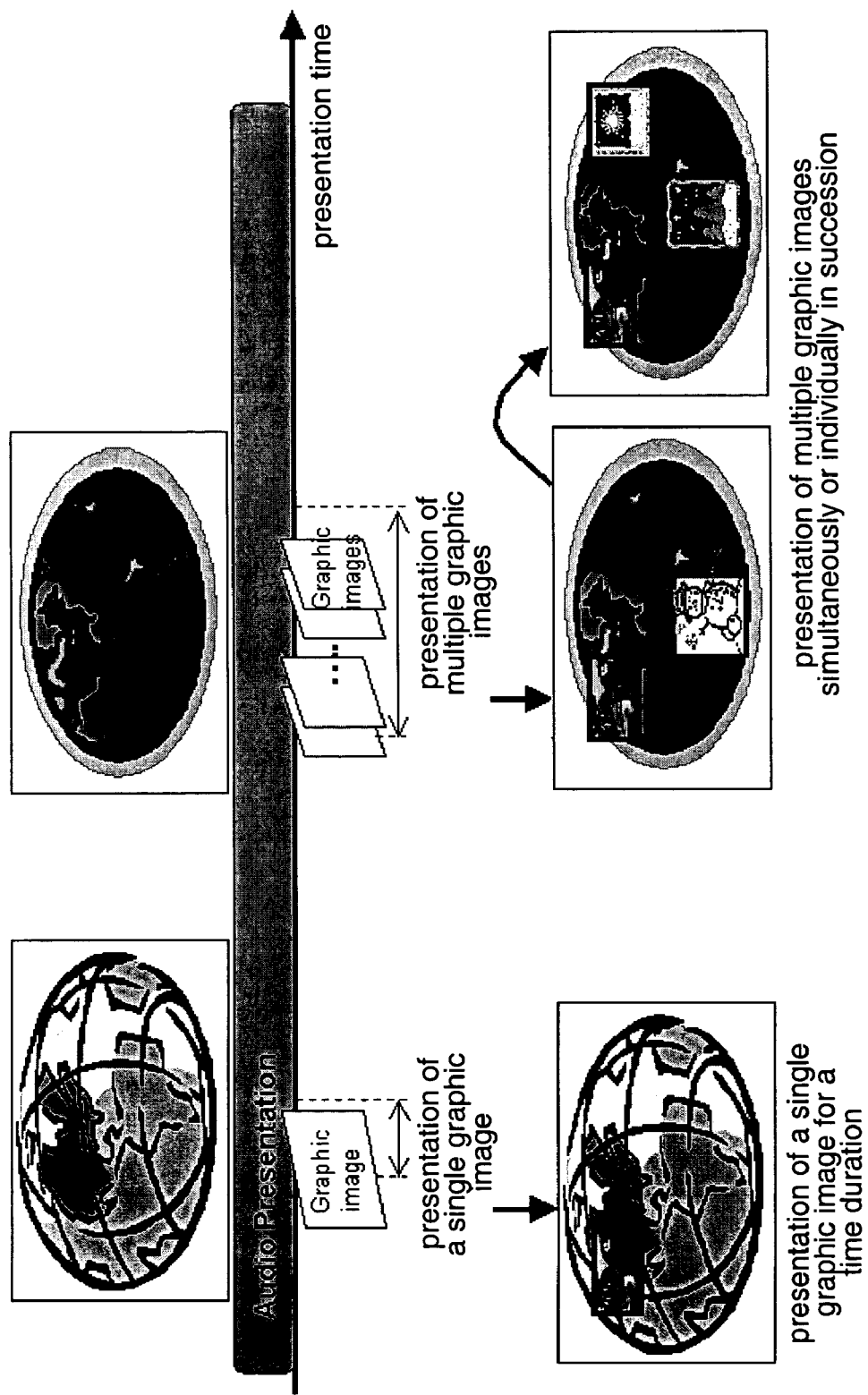

The graphic images may be presented along with audio and still images as shown in FIG. 13, wherein the graphic images are overlaid on the still images at a particular position(s). The graphic images may be overlaid on one still image simultaneously or individually in succession and the positions of the graphic images on the still images may be different from each other.

Figure 14:
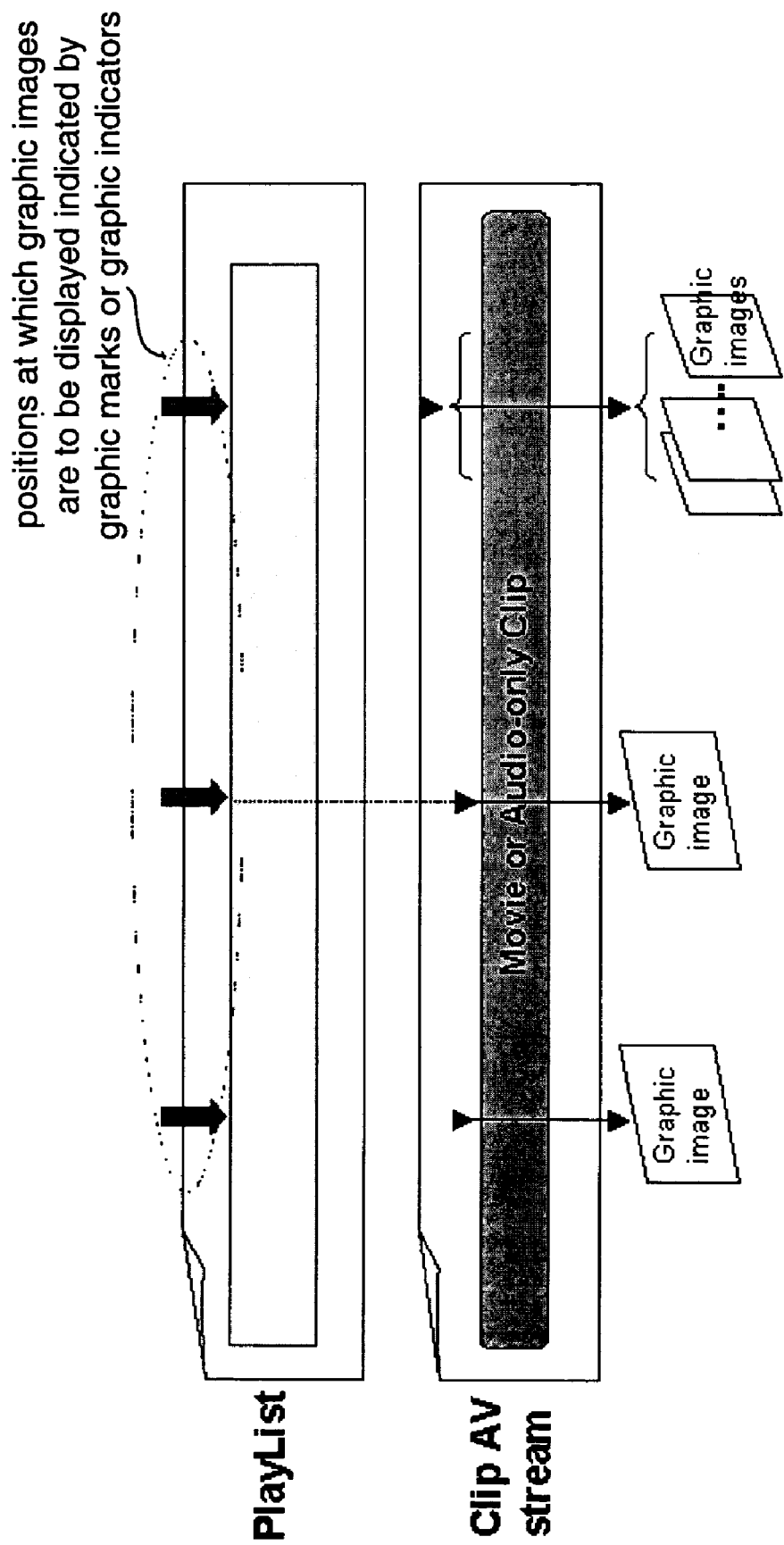

In an embodiment of a method of recording and managing navigation information for reproduction of the graphic images as shown in FIG. 14, navigation information for one or multiple graphic images is stored in a playlist for playback control of a movie or audio-only clip A/V stream as graphic marks or playlist graphic indicators.

When the navigation information is stored as graphic marks, the mark syntax of, for example, the BD-RE standard may be used for the graphic mark by extending the meaning of each field thereof, as shown in FIG. 15. Accordingly only the difference from the BD-RE standard will be described. The mark_type field of the graphic mark is given a unique value that is not defined in the BD-RE standard, for example, 'mark_type=0×13'.

The graphic mark includes ref_to_graphic_start_index field for indexing a beginning graphic image or graphic image group, duration information for specifying display duration required for all of the graphic images, and number_of_graphic_images field indicative of the number of graphic images to be displayed.

For each graphic image, the graphic mark further includes a ref_to_graphic image_index field for indexing each of the graphic images, display timing information for specifying display start time and display duration for each of the graphic images, display_info field for specifying display position and window size of each of the graphic images on a main image, and display_effect field for providing various graphic effects such fade/wipe-in/wipe-out for each of the graphic images.

When the navigation information is stored as playlist graphic indicators, the syntax of the playlist graphic indicator, which is not defined in the BD-RE, is newly defined and a unique version number that is not used in the BD-RE is assigned to the playlist graphic indicators, as shown in FIG. 16.

The playlist graphic indicator information field includes a length indicator indicating a length of the playlist still indicator information field and a number_of_Graphic_Display_positions field indicating the number of graphic display positions. For each graphic display position, the playlist graphic indicator field further includes a graphic_display_start_time_stamp field, and duration information.

The playlist graphic indicator further includes number_of_graphic_images field indicative of the number of graphic images to be displayed. For each image, the following additional fields are provided: a ref_to_graphic_image_index field for indexing each of the graphic images, display timing information for specifying display start time and display duration for each of the graphic images, display_info field for specifying display position and window size of each of the graphic images on a main image, and display_effect field for providing various graphic effects such fade/wipe-in/wipe-out.

In another embodiment shown in FIG. 17, navigation information for one or multiple graphic images is stored as sub-playitems in a playlist for playback control of a movie or audio-only clip A/V stream. The syntax of the sub-playitem for graphic images is extended from the syntax of the general sub-playitem defined for managing dubbed audio in the BD-RE.

As shown in FIG. 18, the syntax of the sub-playitem for graphic images conforms to the syntax of the general sub-playitem but some fields are extended to include graphic control information. Accordingly, only the differences from the general definition will be described. The length field of the sub-playitem is given a unique value greater than or equal to the 26 bytes that is defined in Ver. 1.0 of BD-RE standard.

The sub-playitem includes a Clip_codec_identifier field for indicating that the sub-playitem is associated with a graphic image and a SubplayItem_type field for specifying a path for displaying the associated graphic image. For example, the Clip_codec_identifier field may have a value of 'GRAF' and the SubplayItem_type may have a value of 4.

The sub-playitem includes SubPlayItem_IN_time field for indicating the display time of a beginning graphic image and SubPlayItem_OUT_time for indicating display duration or ending time of all of the graphic images. The sub-playitem further includes ref_to_graphic_image_index field for indexing each of the graphic images, display timing information for specifying display start time and display duration for each of the graphic images, display_info field for specifying display position and window size of each of the graphic images on a main image, and display_effect field for providing various graphic effects such fade/wipe-in/wipe-out for each of the graphic images.

In another embodiment of a method of recording and managing navigation information for reproduction of graphic images along with still images, the navigation information is stored as still image information, which includes a graphic_display_info field, as shown in FIG. 19. The still image information may be stored in a playlist file or stored as an individual file. For example, the playlist graphic indicator of FIG. 16 may be newly defined as a graphic display information field in the still image information field.

The graphic display information field includes a length indicator indicating a length of the graphic display information field and a number_of_graphic_images field indicating the number of graphic images to be displayed. For each graphic image, the graphic display information field includes the fields of: a ref_to_graphic_image_index field for indexing each of the graphic images, display timing information for specifying display start time and display duration for each of the graphic images, display_info field for specifying display position and window size of each of the graphic images on a main image, and display_effect field for providing various graphic effects such fade/wipe-in/wipe-out, as described above with reference to FIG. 18.

In an embodiment of a method of recording and managing navigation information for reproduction of graphic images as buttons on the screen, the navigation information is stored as Button_Info contained in menu information, as shown in FIG. 20. The menu information may be stored in a playlist file or stored as an individual file.

Button information is provided for each button. The button information is navigation information for reproduction of graphic images to be displayed as a button. Each button information field includes a length field indicating the length of the button information field, ref_to_graphic_image_index field for indexing each of the graphic images, display timing information for specifying display start time and display duration for each of the graphic images, display_info field for specifying display position and window size of each of the graphic images on a main image, and display_effect field for providing various graphic effects such fade/wipe-in/wipe-out, as described above with reference to FIG. 18.

Figure 21:
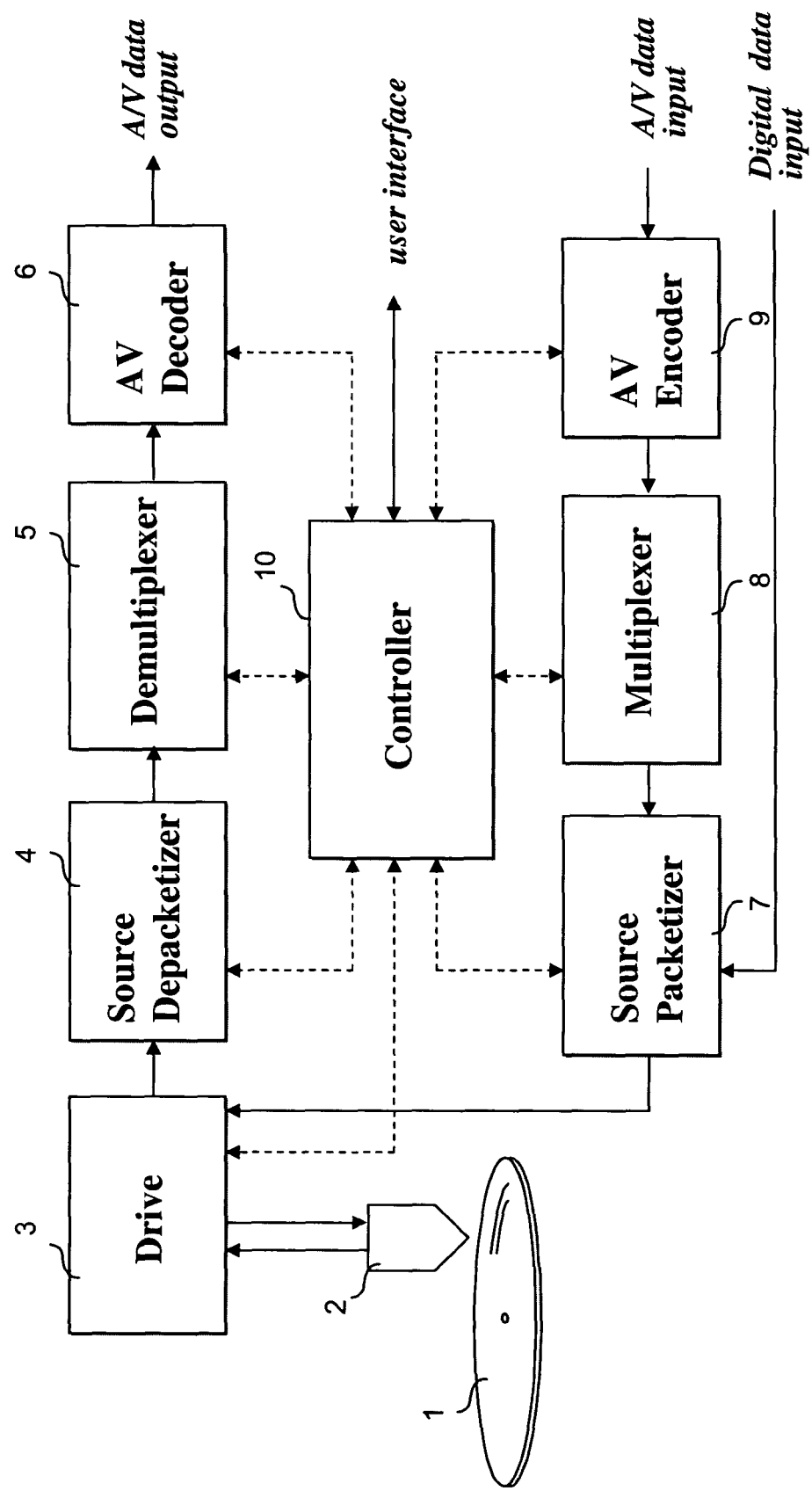
FIG. 21 illustrates a schematic diagram of an embodiment of an optical disk recording and reproducing apparatus according to the present invention.

FIG. 21 illustrates a schematic diagram of an embodiment of an optical disk recording and reproducing apparatus according to the present invention. As shown, an AV encoder 9 receives and encodes data (e.g., movie video and audio data, only audio data, and/or still image data). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 21, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record the data structures of FIG. 5 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller controls the drive 3 to reproduce the data from the optical disk. For example, as discussed above with respect to the embodiments of the present invention, a still image or still images may be reproduced based on the navigation information provided in a still information file.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 21 has been described as a recording and reproducing apparatus, it will be understood that only a recording or only a reproducing apparatus may be provided using those portions of FIG. 21 providing the recording or reproducing function.

The recording medium having a data structure for, and the methods and apparatuses of, managing graphic data for a high-density recording medium in accordance with the invention allows one or more graphic images to be overlaid on a movie video or still image simultaneously or individually in succession, allows graphic images to be presented along with audio, and allows displaying of various graphic images such as buttons for selecting associated functions.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. An optical disc having a data structure for managing reproduction of graphic data, the optical disc comprising:
a data area storing a plurality of transport packets representing graphic segments, the graphic segments including graphic images to be overlaid on main video data and navigation information controlling the graphic images, the transport packets of the graphic segments being multiplexed in sequential order within a data stream, a first transport packet of each graphic segment including attribute information of a corresponding graphic segment, the transport packets of the graphic segments having a same packet identifier (PID);
wherein the navigation information includes position information and time stamps of the graphic images, and the graphic segments provide display effects for the graphic images, the display effects including at least one of fade effect and wipe effect.

2. The optical disc of claim 1, wherein the navigation information includes presentation time to display the graphic images, and duration to display the graphic images.

3. The optical disc of claim 1, wherein the optical disc further stores a playlist including the navigation information.

4. The optical disc of claim 3, wherein the playlist includes a graphic mark indexing the graphic images and specifying display duration of the graphic images.

5. The optical disc of claim 3, wherein the playlist includes display information for specifying display start and end times of the graphic images and display position and window size of the graphic images on the main video data.

6. A method of reproducing a data structure for managing reproduction of graphic data from an optical disc, the method comprising:
reading a data stream including a plurality of transport packets representing graphic segments, the graphic segments including graphic images to be overlaid on main video data and navigation information controlling the graphic images, the transport packets of the graphic segments being multiplexed in sequential order within the data stream, a first transport packet of each graphic segment including attribute information of a corresponding graphic segment, the transport packets of the graphic segments having a same packet identifier,
the navigation information including position information and time stamps of the graphic images, and the graphic segments providing display effects for the graphic images, the display effects including at least one of fade effect and wipe effect;
reproducing the main video data and the graphic segments, displaying the graphic images on the main video data according to the navigation information.

7. The method of claim 6, wherein the navigation information includes presentation time to display the graphic images, and duration to display the graphic images.

8. The method of claim 6, further comprising:
reproducing a playlist from the optical disc, the playlist including the navigation information; and
reproducing the graphic segments using the playlist.

9. The method of claim 8, wherein the playlist includes a graphic mark indexing the graphic images and specifying display duration of the graphic images.

10. The method of claim 8, wherein the playlist includes display information for specifying display start and end times of the graphic images and display position and window size of the graphic images on the main video data.

11. An apparatus for reproducing a data structure for managing reproduction of graphic data from an optical disc, the apparatus comprising:
a reproducing device configured to read a data stream including a plurality of the transport packets representing graphic segments, the graphic segments including graphic images to be overlaid on main video data and navigation information controlling the graphic images, the transport packets of the graphic segments being multiplexed in sequential order within the data stream, a first transport packet of each graphic segment including attribute information of a corresponding graphic segment, the transport packets of the graphic segments having a same packet identifier (PID),
the navigation information including position information and time stamps of the graphic images, the graphic segments providing display effects for the graphic images, the display effects including at least one of fade effect and wipe effect; and
a controller configured to control the reproducing device to reproduce the main video data and the graphic segments, and display the graphic images on the main video data according to the navigation information.

12. The apparatus of claim 11, wherein the navigation information includes presentation time to display the graphic images, and duration to display the graphic images.

13. The apparatus of claim 11, wherein the controller controls the reproducing device to reproduce the graphic segments using a playlist, the playlist including the navigation information.

14. The apparatus of claim 13, wherein the playlist includes a graphic mark indexing the graphic images and specifying display duration of the graphic images.

15. The apparatus of claim 13, wherein the playlist includes display information for specifying display start and end times of the graphic images and display position and window size of the graphic images on the main video data.

16. A method of recording a data structure for managing reproduction of graphic data on an optical disc, the method comprising:
recording a plurality of transport packets representing a graphic segments, the graph segments including a graphic images to be overlaid on main video data and navigation information controlling the graphic images, the transport packets of the graphic segments being multiplexed in sequential order within a data stream, a first transport packet of each graphic segment including attribute information of a corresponding graphic segment, the transport packets of the graphic segments having a same packet identifier (PID),
wherein the navigation information includes position information and time stamps of the graphic images, and the graphic segments provide display effects for the graphic images, the display effects including at least one of fade effect and wipe effect.

17. The method of claim 16, wherein the navigation information includes presentation time to display the graphic images, and duration to display the graphic images.

18. The method of claim 16, further comprising:
recording a playlist including the navigation information.

19. The method of claim 18, wherein the playlist includes a graphic mark indexing the graphic images and specifying display duration of the graphic images.

20. The method of claim 18, wherein the playlist includes display information for specifying display start and end times of the graphic images, and display position and window size of the graphic images on the main video data.

21. An apparatus for recording a data structure for managing reproduction of graphic data on an optical disc, the apparatus comprising:
a recording device configured to record data on the optical disc; and
a controller configured to control the recording device to record a plurality of transport packets representing a graphic segments, the graphic segments including graphic images to be overlaid on main video data and navigation information controlling the graphic images, the transport packets of the graphic segments being multiplexed in sequential order within a data stream, a first transport packet of each graphic segment including attribute information of a corresponding graphic segment, the transport packets of the graphic segments having a same packet identifier (PID),
wherein the navigation information including position information and time stamps of the graphic images, and the graphic segments provide display effects for the graphic images, the display effects including at least one of fade effect and wipe effect.

22. The apparatus of claim 21, wherein the navigation information includes presentation time to display the graphic images, and duration to display the graphic images.

23. The apparatus of claim 21, wherein the controller controls the recording device to record a playlist including the navigation information.

24. The apparatus of claim 23, wherein the playlist includes a graphic mark indexing the graphic images and specifying display duration of the graphic images.

25. The apparatus of claim 23, wherein the playlist includes display information for specifying display start and end times of the graphic images and display position and window size of the graphic images on the main video data.

* * * * *